US008286327B2

(12) United States Patent
Jung

(10) Patent No.: US 8,286,327 B2
(45) Date of Patent: Oct. 16, 2012

(54) METHOD FOR MANUFACTURING RADIO FREQUENCY DEVICE

(75) Inventor: Myoung Joon Jung, Gyeonggi-Do (KR)

(73) Assignee: Ace Technologies Corporation, Incheon (KR)

( * ) Notice: Subject to any disclaimer, the term of this patent is extended or adjusted under 35 U.S.C. 154(b) by 31 days.

(21) Appl. No.: 12/530,060

(22) PCT Filed: Mar. 10, 2008

(86) PCT No.: PCT/KR2008/001352
§ 371 (c)(1), (2), (4) Date: Sep. 4, 2009

(87) PCT Pub. No.: WO2008/111782
PCT Pub. Date: Sep. 18, 2008

(65) Prior Publication Data

US 2010/0102902 A1 Apr. 29, 2010

(30) Foreign Application Priority Data

Mar. 12, 2007 (KR) ........................ 10-2007-0023972

(51) Int. Cl.
*H01S 4/00* (2006.01)

(52) U.S. Cl. ............ 29/592.1; 29/593; 29/600; 333/133

(58) Field of Classification Search ................. 29/592.1, 29/527.2, 594, 600, 601; 333/302, 203, 230, 333/133–134; 343/767
See application file for complete search history.

(56) References Cited

U.S. PATENT DOCUMENTS

| | | | | |
|---|---|---|---|---|
| 4,028,652 | A * | 6/1977 | Wakino et al. | 333/209 |
| 5,329,687 | A * | 7/1994 | Scott et al. | 29/527.2 |
| 6,255,917 | B1 | 7/2001 | Scott | |
| 6,707,353 | B1 * | 3/2004 | Yamakawa et al. | 333/202 |
| 6,919,782 | B2 * | 7/2005 | Sauder et al. | 333/202 |
| 6,933,804 | B2 * | 8/2005 | Rathgeber et al. | 333/134 |
| 7,843,286 | B2 * | 11/2010 | Kley et al. | 333/202 |
| 7,965,251 | B2 * | 6/2011 | Hesselbarth | 343/767 |

FOREIGN PATENT DOCUMENTS

| | | | |
|---|---|---|---|
| EP | 1746681 | A | 1/2007 |
| JP | 61-141204 | A | 6/1986 |
| WO | 2004-054033 | A | 6/2004 |

* cited by examiner

*Primary Examiner* — Minh Trinh
(74) *Attorney, Agent, or Firm* — Edwards Wildman Palmer LLP

(57) ABSTRACT

Disclosed is a method for manufacturing an RF device. The method comprises the steps of (a) forming a metal sheet where interior structure of the RF device is formed; (b) attaching a plastic material housing to the formed metal sheet; and (c) performing silver plating on the RF device on which the plastic material housing is attached.

6 Claims, 3 Drawing Sheets

[Fig. 1]
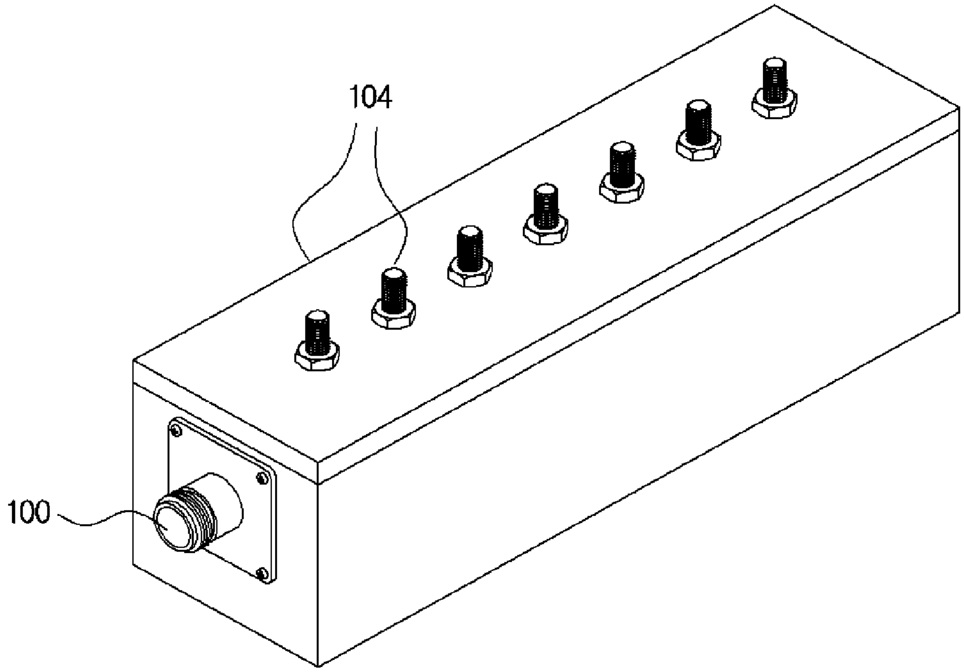
[Fig. 2]
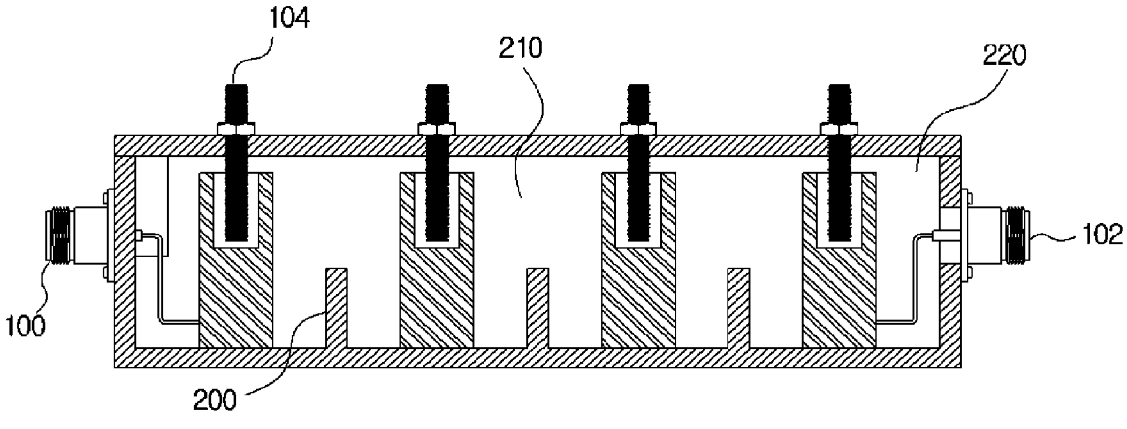

[Fig. 3]
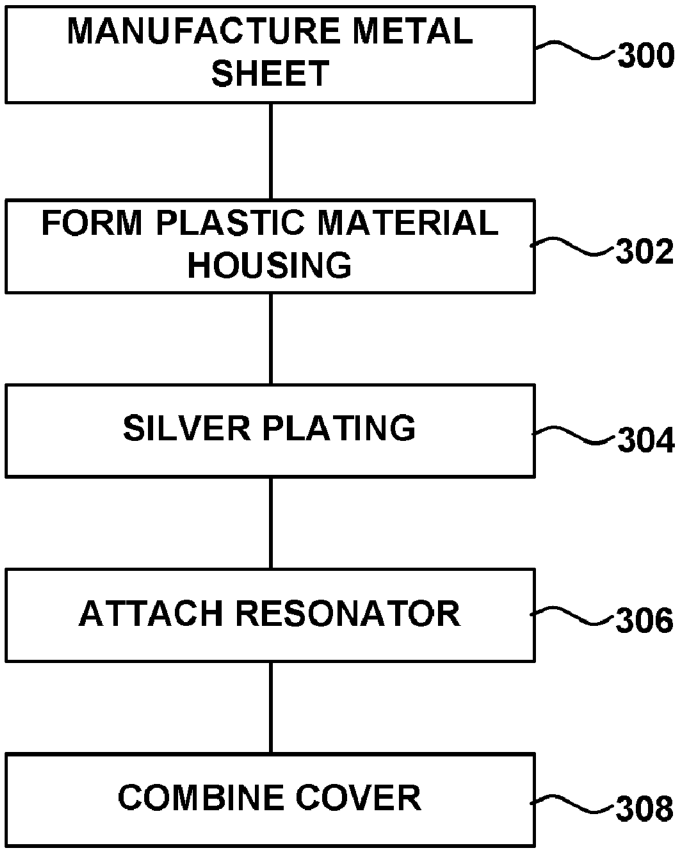
[Fig. 4]
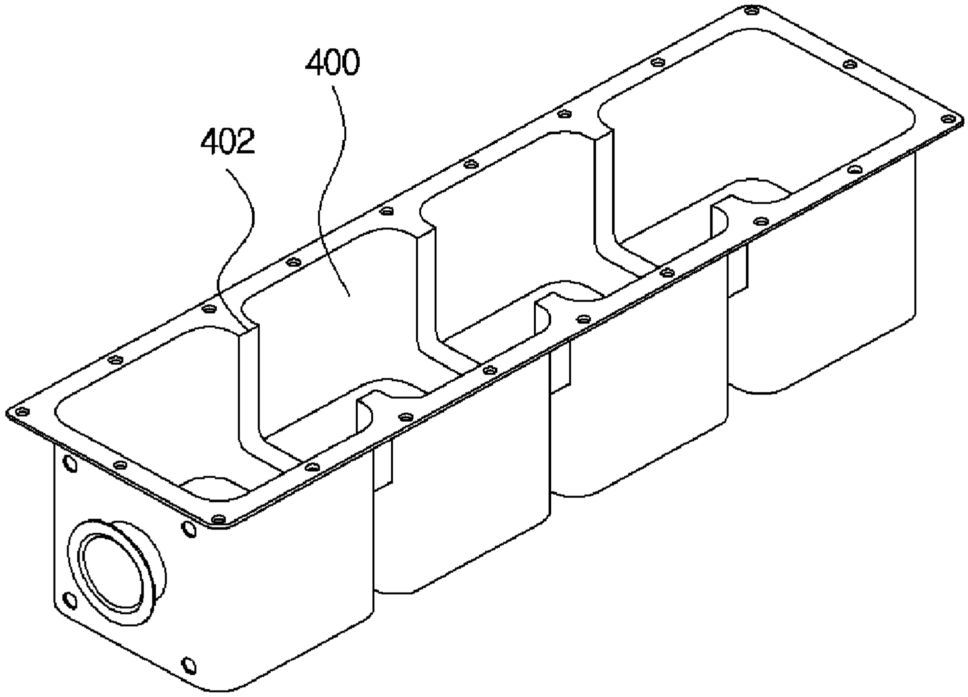

[Fig. 5]
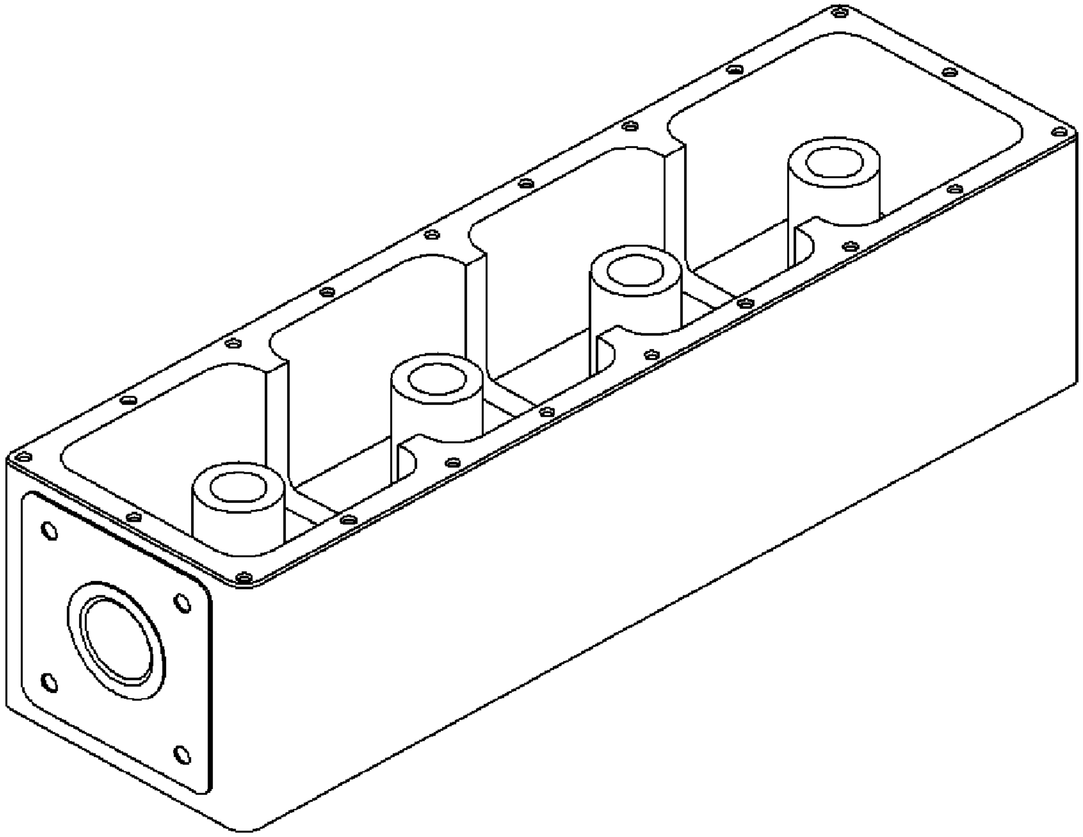

METHOD FOR MANUFACTURING RADIO FREQUENCY DEVICE

CROSS-REFERENCES TO RELATED APPLICATIONS

This application is a U.S. national phase application, pursuant to 35 U.S.C. §371, of PCT/KR2008/001352, filed Mar. 10, 2008, designating the United States, which claims priority to Korean Application No. 10-2007-0023972, filed Mar. 12, 2007. The entire contents of the aforementioned patent applications are incorporated herein by this reference.

TECHNICAL FIELD

The present invention relates to a method for manufacturing an RF device and an RF device manufactured by the same, more particularly to a method for manufacturing an RF device and an RF device manufactured by the same, the RF device of which the interior part is silver plated for resonance and transmission of RF signal, the RF device including an RF cavity filter, a wave guide, and a tower mounted amplifier.

BACKGROUND ART

In accordance with development of mobile communication, optical communication and satellite communication and popularization of mobile phones, producing of RF devices for processing RF signal such as filter, duplexer and waveguide is being increased.

In processing high frequency RF signal such as microwave, Skin effect occurs that high frequency current becomes maximized on surface layer. In order to obtain desired characteristic in desired frequency band, alternating current loss should be reduced. In order to reduce loss, plating process is performed, and silver plating is generally performed.

It is known that surface roughness and plating method affects alternating current loss. In order to reduce loss, proper plating method should be used corresponding to shape of the device and proper plating solution should be selected.

Further, by proper plating treatment, throwing power and surface roughness should be improved and adhesion should also be improved while reducing electronic resistance.

On the other side, the thickness of plating layer is associated with the skin effect in high frequency, the skin depth by the skin effect can be expressed by following equation 1.

$$\frac{1}{\sqrt{\pi f \mu \sigma}} \quad \text{[Equation 1]}$$

In equation 1, $\pi$ is constant, $\mu$ is magnetic permeability, f is frequency and $\sigma$ is conductivity.

Among various RF devices on which silver plating is performed, in case of RF cavity filter, the silver plating was performed after basic structure of which the material is aluminum or aluminum alloy was manufactured. Generally, basic structure is manufactured through mold and the silver plating is performed by digesting the basic structure in plating solution in order to manufacture RF device.

As described above, when the basic structure of aluminum material is manufactured and then silver plating is performed, weight of the RF device becomes heavier and the silver plating is performed on unnecessary part such as exterior part. Silver plating layer of exterior part was main cause of corrosion and discoloration when the RF device is used for a long time.

In another conventional method for manufacturing the RF device, basic structure was made of plastic material and then silver plating was performed on the plastic material basic structure.

When the silver plating is performed on plastic material, weight of the RF device is may be lighter. However, plating method becomes more complex than case that silver plating is performed on metal. Further, although silver plating is performed on the plastic material, silver plating was still performed on unnecessary part such as exterior part of the RF device. Furthermore, depreciation by heat such as wrench by heat was more serious when plastic is used.

DISCLOSURE OF INVENTION

Technical Problem

Accordingly, the present invention provides a method for manufacturing RF device and RF device manufactured by the same where silver plating is selectively performed on only the necessary part of the RF device.

The present invention further provides a method for manufacturing RF device and RF device manufactured by the same where exterior part of the RF device is made of plastic so that the silver plating is performed on only interior part of the RF device.

The present invention further provides a method for manufacturing RF device and RF device manufactured by the same weight of the RE device is lighter and depreciation by heat can be reduced.

Other objects of the present invention may be deduced by those who skilled in the art through the following embodiments.

Technical Solution

In order to achieve above-mentioned objects, according to an aspect of the present invention, there is provided a method for manufacturing an RF device, comprising the steps of: (a) forming a metal sheet where interior structure of the RF device is formed; (b) attaching a plastic material housing to the formed metal sheet; and (c) performing silver plating on the RF device on which the plastic material housing is attached.

The plastic material housing is attached to the metal sheet through an insert injection molding in step (b), the metal sheet being an insert member.

The metal sheet is performed through deep drawing for a metal plate

The silver plating is performed for the interior part of the RF device implemented with the metal sheet and the silver plating is not performed for the housing made of plastic The RF device includes an RF cavity filter, an RF diplexer, a waveguide and a TMA (Tower Mounted Amplifier)

The method further comprises the step of attaching a resonator with metal material or dielectric material to the metal sheet if the RF device is an RF cavity filter.

According to another aspect of the present invention, an RF filter manufactured by the above-described methods is provided.

Advantageous Effects

As described above, according to a preferred embodiment of the present invention, the silver plating can be performed selectively only for the necessary part. The silver plating is performed only in the interior part of the RF filter and exterior part of the RF device is plastic material.

Further, according to the preferred embodiment of the present invention, the weight of the RF device can be lighter compared with conventional RF device as the housing is made of plastic. Furthermore, depreciation by heat can be prevented although plastic material is used.

BRIEF DESCRIPTION OF THE DRAWINGS

FIG. 1 is an external appearance of an RF filter among various RF devices to which the present invention can be applied.

FIG. 2 is a cross-sectional view of the general RF cavity filter illustrating interior part of the RF cavity filter.

FIG. 3 is a flow chart of RF device manufacturing method according to a preferred embodiment of the present invention.

FIG. 4 is an example of the metal sheet that is used in manufacturing RF cavity filter according to a preferred embodiment of the present invention.

FIG. 5 is an RF cavity filter of which the housing is produced by the insert injection molding according to a preferred embodiment of the present invention.

MODE FOR THE INVENTION

Hereinafter, preferred embodiment of method for manufacturing RF device and RF device manufactured by the same according to the present invention is described referring to attached figures.

FIG. 1 is an external appearance of an RF filter among various RF devices to which the present invention can be applied.

Referring to FIG. 1, there are an input connector 100 and output connector (not shown) on outer part of the RF filter and plurality of tuning bolts 104 are coupled on upper part of the RF filter.

RF signal is inputted to the input connector 100 through external cable. Filtered RF signal is outputted through the output connector.

Tuning bolts 104 are inserted to inside of the filter. Tuning bolts are for tuning center frequency and bandwidth of the filter. End points of the inserted tuning blots are over the resonators in the filter in order to change capacitance that determines center frequency or change bandwidth of the filter.

Conventionally, exterior part of the filter was plated with silver. As described, base structure is manufactured with aluminum or plastic and silver plating is performed on the base structure. Generally, painting was performed on the silver-plated exterior part.

Exterior part of the cavity filter is not associated with processing RF signal. However, as the silver plating cannot be performed partially for the base structure, the exterior part of the cavity filter was unnecessarily plated with silver in conventional art.

According to the preferred embodiment of the present invention, exterior part of the RF cavity filter is made of plastic, and plastic exterior part of the RE cavity filter is not plated with silver. Therefore, corrosion trouble of the exterior part on account of silver plating does not occur and the RF filter can be used for longer time compared with conventional RF filter.

Detailed manufacturing method of the RF filter according to the present invention is described referring to other figures.

FIG. 2 is a cross-sectional view of the general RF cavity filter illustrating interior part of the RF cavity filter.

Referring to FIG. 2, plurality of cavities 210 defined by plurality of walls 200 are formed and plurality of resonators 220 are located in each of the cavity 210.

In FIG. 2, RF signal inputted through the input connector is resonated in each cavity and the filtering for the RF signal is performed. The resonator in each cavity may be metal or dielectric. Generally, dielectric resonators are used in TE mode resonation and metal resonators are used in TM mode resonation.

The resonator may be formed as one body with the base structure when base structure is manufactured. Otherwise, the resonator may be combined with the base structure using bolts after base structure is manufactured.

One of four walls defining cavity is partially open, and RF signal propagates to the open part while being resonated in each cavity. The number of cavities corresponds to the number of poles. The number of cavities is determined based on insertion loss and skirt characteristic.

As the number of cavities increases, the skirt characteristic improves while the insertion loss increases. The skirt characteristic and the insertion loss are in relation of trade off.

Interior part of the RF cavity filter is plated with silver in order to minimize loss.

Structure of RF cavity filter among various RF devices to which the present invention can be applied was described schematically above referring to FIG. 1 and FIG. 2. Hereinafter, it is described the manufacturing method of the present invention by which exterior part of the RF device is made of plastic and the silver plating is performed only on the interior part of the RF device.

FIG. 3 is a flow chart of RF device manufacturing method according to a preferred embodiment of the present invention.

Referring to FIG. 3, a metal sheet is manufactured where interior elements are formed in step 300. The shape of the metal sheet may be various depending on the RF device. FIG. 4 is an example of the metal sheet that is used in manufacturing RF cavity filter according to a preferred embodiment of the present invention.

Referring to FIG. 4, the metal sheet includes a base body 400 and plurality of walls 402 in order to define cavity. That is, the base body is in shape of case, and walls for cavity are formed in the case-shape base body.

According to an embodiment of the present invention, the metal sheet as shown in FIG. 4 may be manufactured by deep drawing method.

Deep drawing method is one of metal forming process in which bowl shape or cylinder shape is formed using malleability of metal. Deep drawing method includes panel beating method in which metal is formed by striking metal on a prop using hammer, a die drawing method in which die and punch are used and a spinning method in which metal plate is pushed by die on a lathe.

According to an embodiment of the present invention, metal plate is inserted in deep drawing device having a plurality of punches and the inserted metal plate is sled while being struck by dropping punches installed sequentially on a die in order to manufacture metal sheet having desired form.

At this deep drawing process, schematic shape is firstly formed using relatively big punch, and then detailed shape is formed using relatively small punch.

Besides above-described deep drawing method by die drawing, panel beating can also be used for deep drawing.

In above description, a case that metal sheet is formed by deep drawing method is described. However, metal sheet manufacturing method is not limited to the deep drawing, and it would be obvious to those skilled in the art that various manufacturing method other than deep drawing can be used. In manufacturing metal sheet, connector can be formed together. Otherwise, hole for coupling the connector is formed in manufacturing the metal sheet and then connector can be coupled to the metal sheet through the hole.

After metal sheet is formed in step 300, housing of the RF cavity filter is formed. According to a preferred embodiment of the present invention, housing of the RF cavity filter is formed by insert injection molding in step 302. Therefore, exterior part of the housing is plastic material. Herein, the housing means side part and bottom part of the RF filter, the cover which is upper housing will be combined later using bolts, etc.

Insert injection molding is a one of forming process manufacturing a one body product by injecting resin to various insert members of different material and different color. In the present invention, insert member is the metal sheet. Insert injection molding is used in order to compensate characteristic such as solidity and quality of material which is hard to obtain with single material.

According to a preferred embodiment of the present invention, the metal sheet that is the insert member is laid on a lower mold in insert injection molding, and the lower mold is fixed on a lower plate on a table. The lower plate can be installed movable to left or right direction through a rod of a moving cylinder, etc.

There is an upper plate in correspondence with the lower plate. The upper plate is movable up and down through the rod of vertical moving cylinder. Below the upper plate is laid an upper mold that is combined with the lower mold or separated with the lower mold.

Resin solution is injected through an injection gun of the insert injection molding device. The injection gun is coupled to a resin provision tank that performs heating for hot melt resin to be liquid state. The resin provision tank provides resin solution to the injection gun. Through operation of moving cylinders that move the upper plate and the lower plate, the upper plate and the lower plate on which the metal sheet that is the insert member is laid is combined and the resin solution is injected into molding space which is formed inside. A cooling device is additionally installed for cooling the resin solution to be solid state.

Above described insert injection molding is one example of insert injection molding methods. It would be obvious to those skilled in the art that various insert injection methods can be selectively used.

FIG. 5 is an RF cavity filter of which the housing is produced by the insert injection molding according to a preferred embodiment of the present invention.

Referring to FIG. 5, housing is combined to the bottom part and side part of the metal sheet where inner structure of the RF cavity filter is formed.

The plastic material housing operates as a general housing that protects inside part of the RF cavity filter. As the housing is plastic material, RF filter can be lighter than general RF filters of which the housing is aluminum or aluminum alloy.

After housing is formed through the insert injection molding, silver plating is performed in step 304.

According to an embodiment of the present invention, the sliver plating method may comprise a pretreatment process, substrate plating process and silver plating process.

The pretreatment process may comprise a cleaning process, an alkali treatment process, a desmut process and an alkali metathesis treatment process.

The cleaning process is for removing oil for mechanical treatment attached on the metal sheet. The oil for mechanical treatment attached on the metal sheet is cause of plating adhesion inferiority and may cause irregular plating layer. Therefore, cleaning process for removing oil using exclusive cleaner is performed.

When cleaning process is completed, alkali treatment process is performed. The alkali treatment is for improving adhesion between material and plating layer.

When the alkali treatment is completed, the desmut process is performed. The desmut process is for removing metal impurities generated on metal surface during the alkali treatment process. For example, the desmut process may be performed using acid solution in which nitric acid solution or hydrofluoric acid solution is mixed in normal temperature for 10 seconds to 20 seconds.

When desmut process is completed, zincate process is performed. In order for plating on the aluminum, metathesis layer of other metal is necessary. In zincate process, chemical metathesis treatment using metal compound of zinc, nickel, iron or copper is performed on the aluminum surface in order to prevent oxidation of aluminum surface and improve adhesion with nickel layer. For example, the zincate process may be performed with zincate solution having very low concentration in normal temperature for a few seconds or a few minutes. When the pretreatment process is completed, the substrate plating process is performed. The substrate plating process is for obtaining regular and planar surface layer with high quality before electroplating. For example, electroless nickel plating may be performed for the substrate plating.

When the substrate plating is completed, the silver plating is performed. In silver plating process, general electroplating can be performed and solution in which silver cyanide, potassium cyanide, and potassium carbonate are mixed may be used as the solution for silver plating.

As electroplating is performed, silver plating layer is formed on the metal sheet in the RF filter. However, silver plating layer is not formed on the housing.

Therefore, the silver plating is performed on only the necessary part and corrosion on the housing can be prevented.

After silver plating, a process for preventing discoloration may be further performed and tarniban concentrate may be used at this process.

When silver plating is completed, resonators are attached to the filter in step 306. Resonators are attached to bottom of each cavity. According to a preferred embodiment of the present invention, holes for attaching the resonators are formed on the cavity bottom of the metal sheet and plastic material housing, and hole in which thread of screw is formed is also formed in lower part of the resonator in order to attach the resonator to the cavity bottom through bolt joint.

Besides bolt joint, various attaching methods can be used in order to attach the resonator to the cavity bottom. Further, it would be obvious to those skilled in the art that the resonator may be attached to the metal sheet before the silver plating unlike the above-described embodiment.

Furthermore, according to another embodiment of the present invention, the resonator may be formed together when the metal sheet is formed.

When the silver plating and resonator attachment is completed, a cover which is upper housing of the RF filter is combined in step 308. The cover may be metal material such as aluminum or aluminum ally. As shown in FIG. 1, the cover is tetragonal shape and the plurality of tuning bolts are coupled to the cover.

Although embodiments have been described with reference to a number of illustrative embodiments thereof, it should be understood that numerous other modifications and embodiments can be devised by those skilled in the art that will fall within the spirit and scope of the principles of this disclosure.

The invention claimed is:

1. A method for manufacturing a radio frequency device, comprising the steps of:

(a) forming a metal sheet where interior structure of the radio frequency device is formed;

(b) attaching a plastic material housing to the formed metal sheet; and (c) performing silver plating on the radio frequency device on which the plastic material housing is attached, wherein the silver plating is performed for the interior part of the radio frequency device implemented with the metal sheet and the silver plating is not performed for the housing made of plastic.

2. The method of claim 1, wherein the attaching step (b) comprises attaching the plastic material housing to the metal sheet through an insert injection molding, the metal sheet being an insert member.

3. The method of claim 1, wherein the forming step (a) comprises forming the metal sheet through deep drawing for a metal plate.

4. The method of claim 1, wherein the radio frequency device includes a radio frequency cavity filter, a radio frequency diplexer, a waveguide and a Tower Mounted Amplifier (TMA).

5. The method of claim 1, further comprising the step of attaching a resonator with metal material or dielectric material to the metal sheet if the radio frequency device is a radio frequency cavity filter.

6. The method of claim 1, wherein the housing of the step (b) is for side part and bottom part of the radio frequency device, and further comprising the steps of producing a cover and combining the cover on upper part of the radio frequency device.

* * * * *